(12) United States Patent
Binotti et al.

(10) Patent No.: US 6,322,274 B1
(45) Date of Patent: Nov. 27, 2001

(54) SELF-LOCKING ROD END CLIP

(75) Inventors: Marla A. Binotti, Frankfort; James E. Gugle, Manhattan; George Siragusa, Chicago Heights, all of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/469,262

(22) Filed: Dec. 21, 1999

(51) Int. Cl.⁷ ........................................................ E05B 9/08
(52) U.S. Cl. .............................. 403/13; 403/196; 403/187
(58) Field of Search .................................. 403/13, 14, 70, 403/71, 326, 329, 196, 187

(56) References Cited

U.S. PATENT DOCUMENTS

| | | |
|---|---|---|
| 2,853,913 | 9/1958 | Rapata . |
| 3,679,249 | 7/1972 | Hoffmann . |
| 3,695,652 | 10/1972 | Ratnikas . |
| 3,721,059 | 3/1973 | Reynolds . |
| 3,993,410 | 11/1976 | Lindsay, Jr. . |
| 4,306,820 * | 12/1981 | Nelson ................................... 403/13 |
| 4,406,557 | 9/1983 | Suzuki et al. . |
| 4,482,265 | 11/1984 | Koza . |
| 4,591,285 | 5/1986 | Nelson . |
| 4,840,334 * | 6/1989 | Kikuchi .................................. 248/73 |
| 4,953,269 | 9/1990 | Ragsdale . |
| 5,178,479 | 1/1993 | Brown et al. . |
| 5,316,245 | 5/1994 | Ruckwardt . |
| 5,709,498 * | 1/1998 | Sova et al. ........................... 403/196 |
| 5,934,817 * | 8/1999 | Kim et al. ............................. 403/196 |

* cited by examiner

Primary Examiner—Lynne H. Browne
Assistant Examiner—John R. Cottingham
(74) Attorney, Agent, or Firm—Pitney, Hardin, Kipp & Szuch LLP

(57) ABSTRACT

The rod end clip includes a detent head with an aperture therethrough. The aperture provides a pivot point with respect to a rod end onto which the rod end clip is being installed. The detent head subsequently provides a pivot point for the rod with respect to an aperture in a panel into which the detent head is inserted. The rod end clip further includes an arm assembly with a semi-circular seat and a flexible finger. As the rod is pivoted into the arm assembly to be engaged by the semi-circular seat, the flexible finger is urged from an unflexed position to a flexed position. The flexible finger thereafter generates an audible clicking sound as the rod passes from contact with the flexible finger and into the semi-circular seat.

12 Claims, 8 Drawing Sheets

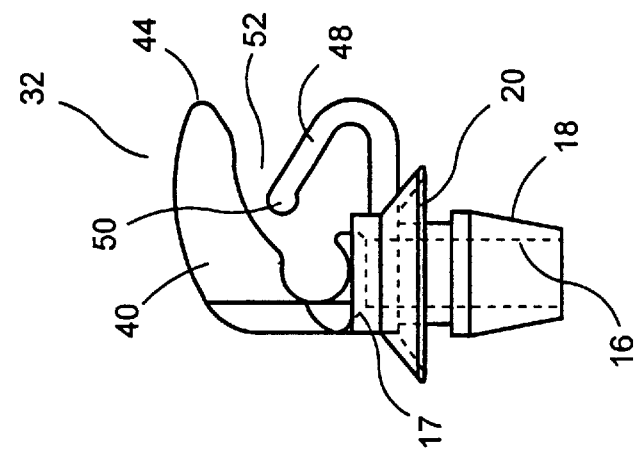
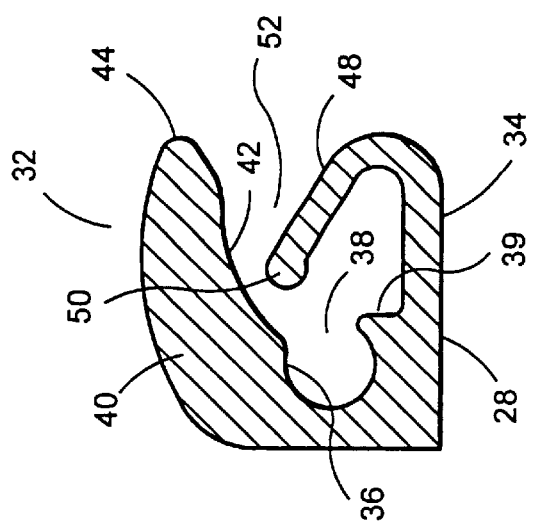
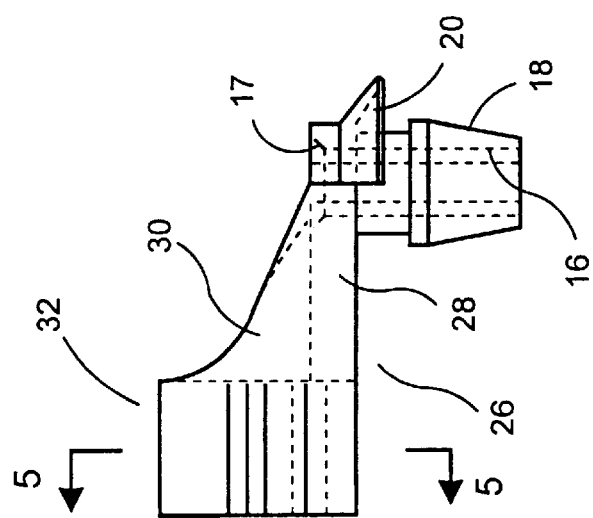

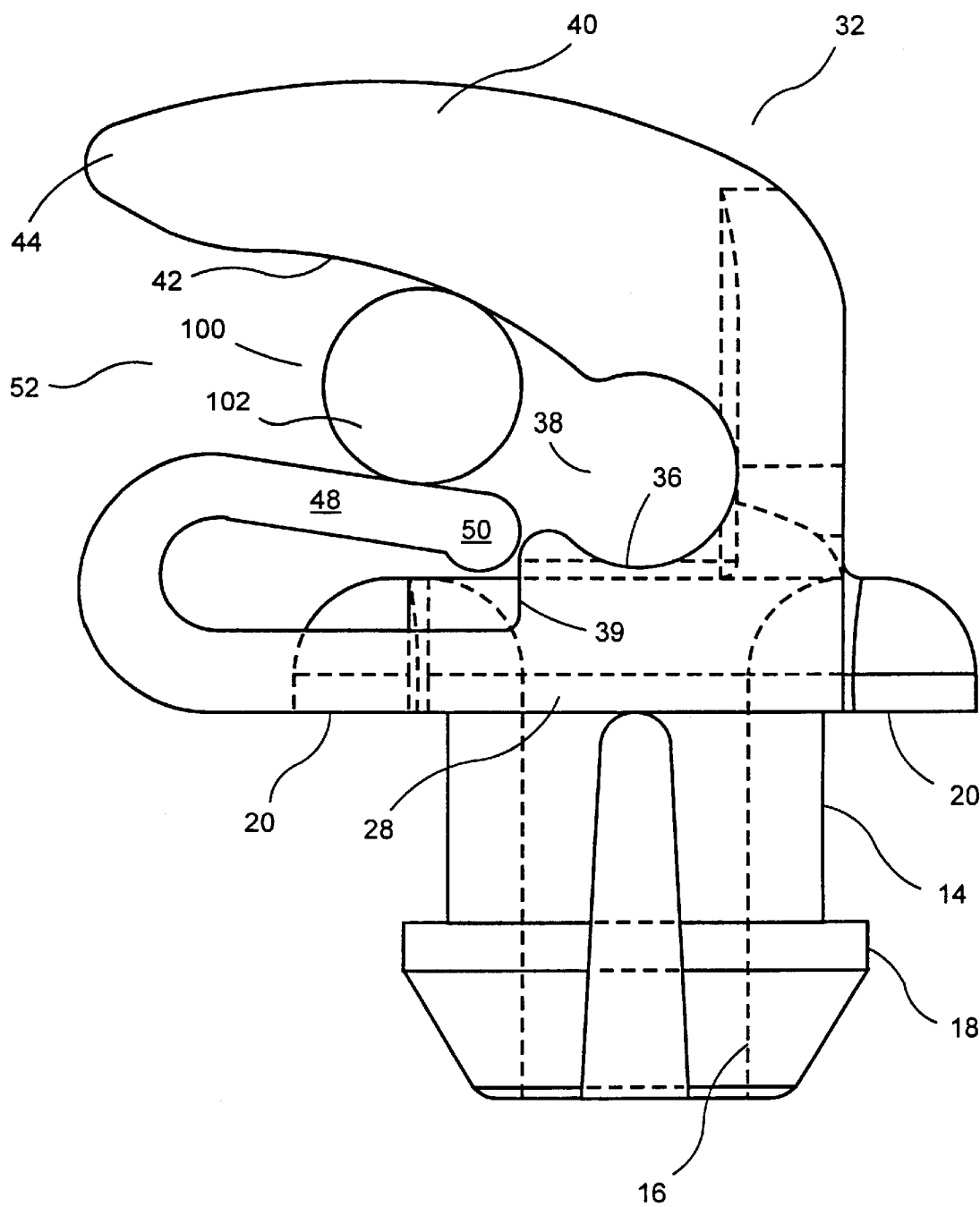
F I G. 9

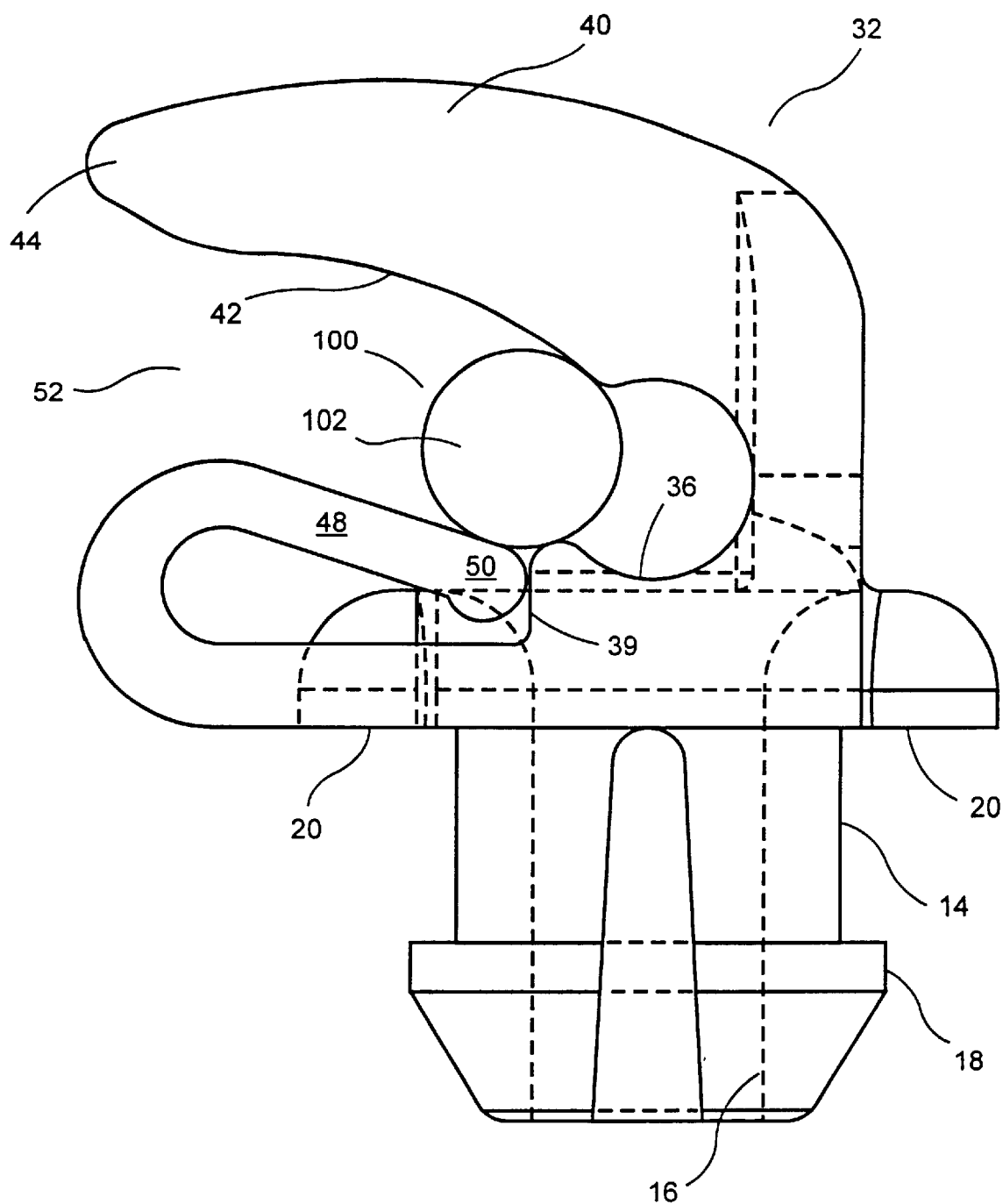
F I G. 10

SELF-LOCKING ROD END CLIP

BACKGROUND OF THE INVENTION

1. Field of the Invention

The present invention relates to a rod end clip for retaining a rod within an aperture. More particularly, the present invention includes a self-locking feature with a flexible arm assembly and a semi-circular seat. The flexible arm assembly includes a flexible finger which moves to a flexed position as the rod is inserted into the flexible arm assembly and thereafter moves back to the unflexed position as the rod travels to the semi-circular seat.

2. Description of the Prior Art

In the prior art, it is known to attach a rod end clip to the end of a rod, wherein the rod has a right angle end portion. Typically, the rod end clip is engaged on the rod end about both sides of the right angle bend. A typical application for such a rod end clip is to attach the rod end to an aperture in a panel so as to serve as a pivot point for subsequent pivoting of the rod.

However, some rod end clips in the prior art have not been simple to install in an assembly line environment. In particular, the rod end clips have not provided, to the extent desired, a locked engagement which is not susceptible to faulty installation. Similar, some rod end clips of the prior art have not indicated to the installer, in an intuitive manner, that the rod end clip has been installed properly.

Examples of prior art rod end clips are disclosed in U.S. Pat. No. 5,178,479 entitled "Rod End Clip" and issued to Brown et al. on Jan. 12, 1993; U.S. Pat. No. 4,591,285 entitled "Rod Retainer" and issued to Nelson on May 27, 1986; U.S. Pat. No. 4,306,820 entitled "Rod Retainer" and issued to Nelson on Dec. 22, 1981; and U.S. Pat. No. 3,993,410 entitled "Rod Retainer" and issued to Lindsay on Nov. 23, 1976.

OBJECTS AND SUMMARY OF THE INVENTION

It is therefore an object of the present invention to provide a rod end clip which securely engages the end of a rod.

It is therefore a further object of the present invention to provide a rod end clip which can be reliably installed on the end of a rod, particularly in an assembly line environment.

It is therefore a still further object of the present invention to provide a rod end clip which provides an intuitive indication to the installer that the rod end clip has been properly and securely installed.

These and objects are attained by providing a rod end clip which has a flexible arm and a semi-circular seat for receiving the rod end. A flexible finger flexes to allow the rod end to approach the semi-circular seat. As the rod continues to the semi-circular seat past the flexible finger, the flexible finger flexes to the original position. The length of the flexible arm can be varied in the design wherein a shorter arm flexes to its original position immediately prior to the entry of the rod into the semi-circular seat so that two clicks are generated (the first by the flexure of the arm, the second by the seating of the rod into the semi-circular seat). A longer arm, however, will flex to the original position substantially simultaneously with the seating of the rod, thereby producing only a single click.

BRIEF DESCRIPTION OF THE DRAWINGS

Further objects and advantages of the invention will become apparent from the following description and claims, and from the accompanying drawings, wherein:

FIG. 4 is a side plan view of the rod end clip of the present invention.

FIG. 5 is a cross-sectional view of the rod end clip of the present invention along plane 5—5 of FIG. 4.

FIG. 6 is a side plan view of the rod end clip of the present invention.

FIGS. 7–11 illustrate a sequence of the installation of a rod into the rod end clip of the present invention.

DETAILED DESCRIPTION OF THE PREFERRED EMBODIMENT

Figure 1:
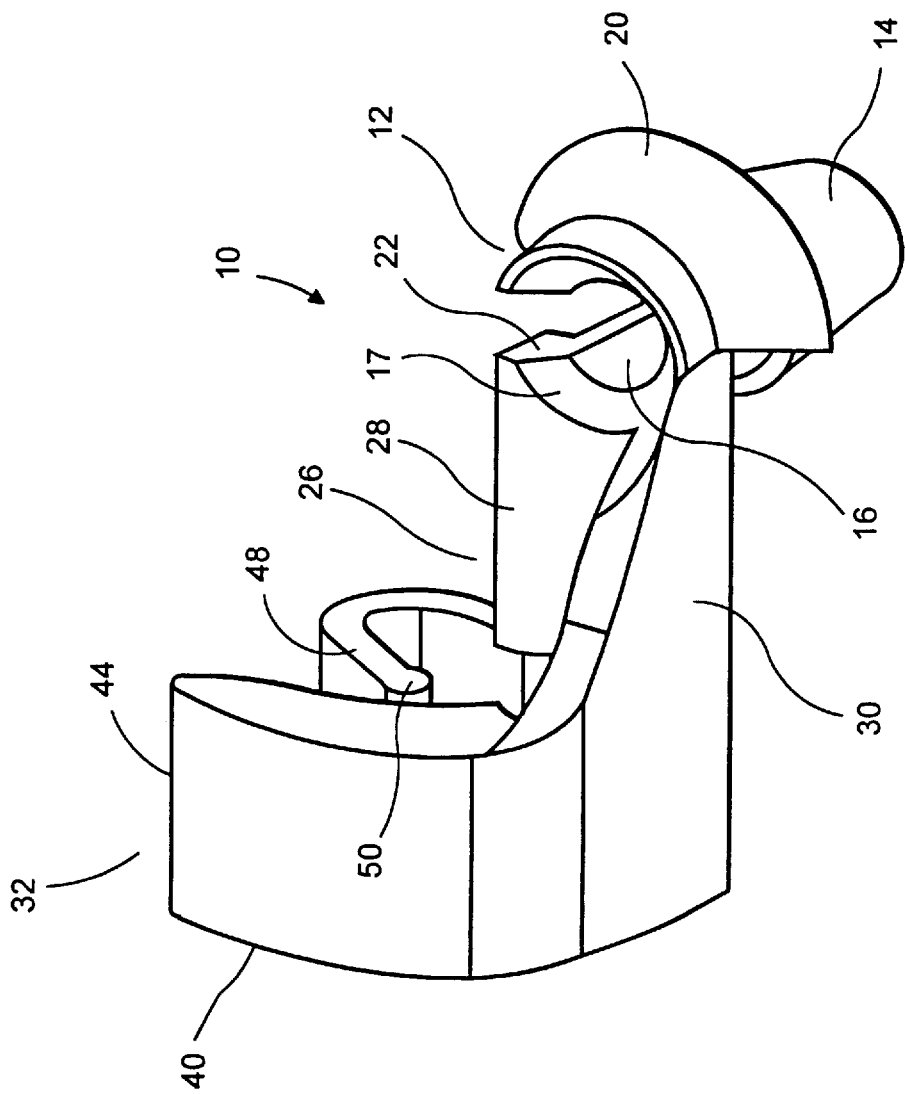
FIG. 1 is a perspective view of the rod end clip of the present invention.

Referring now to the drawings in detail wherein like numerals refer to like elements throughout the several views, one sees that FIG. 1 is a perspective view of the rod end clip 10 of The present invention.

Rod end clip 10 includes detent head 12 with cylindrical walls 14 formed about aperture 16 with chamfered mouth 17. Cylindrical walls 14 include radially extending detent flanges 18 which face downwardly extending umbrella flange 20 for detent engaging a panel (not shown) therebetween. Additionally, cylindrical walls 14 include longitudinally oriented slot 22 in order for cylindrical walls 14 to flex somewhat to engage a range of sizes of rods therewithin. As shown in FIG. 3, rod 100 includes long leg 102 at a right angle to short leg 104. Typically, as will be described in greater detail hereinafter, short leg 104 is inserted through chamfered mouth 17 into aperture 16 and rod end clip 10 is rotated about short leg 104 within aperture 16 (see FIG. 2) during the process of installing rod end clip 10 onto rod 100. Detent head 12 is subsequently inserted into an aperture in a panel (not shown). This detent engagement typically allows for pivoting of detent head 12 in concert with short leg 104 within the aperture in the panel (not shown) thereby providing a pivot point for long leg 102 of rod 100. For some applications wherein pivoting is not desired, however, detent head 12 and radially extending detent flanges 18 may have anti-rotational elements.

Leg assembly 26 extends at a right angle from detent head 12. Leg assembly 26 includes planar floor 28 at a right angle to planar wall 30. As shown in FIG. 3, both planar floor 28 and planar wall 30 abut long leg 102 of rod 100 after installation. Leg assembly 26 supports arm assembly 32.

As shown in FIG. 5, arm assembly 32 includes lower planar surface 34 which is coplanar with the planar floor 28 of leg assembly 26. Semi-circular rod seat 36 is formed above planar floor 28 and typically has a 270° periphery, a mouth 38 with a 90° periphery, and a diameter substantially equal to that of long leg 102 of rod 100 in order to detent engage long leg 102. Face 39 extends from the lower portion of mouth 38 of semi-circular rod seat 36 to planar floor 28. Guide element 40 with inner concave face 42 extends above semi-circular rod seat 36. Inner concave face 42 extends from the upper portion of mouth 38 of semi-circular rod seat 36 to distal end 44 of guide element 40 in order to guide long leg 102 of rod 100 into semi-circular seat 36 (see FIGS. 7–11).

Flexible finger 48 extends from lower planar surface 34 toward inner concave face 42 and includes bulbous distal end 50. Opening 52 is thereby formed between flexible finger 48 and concave face 42.

Figure 2:
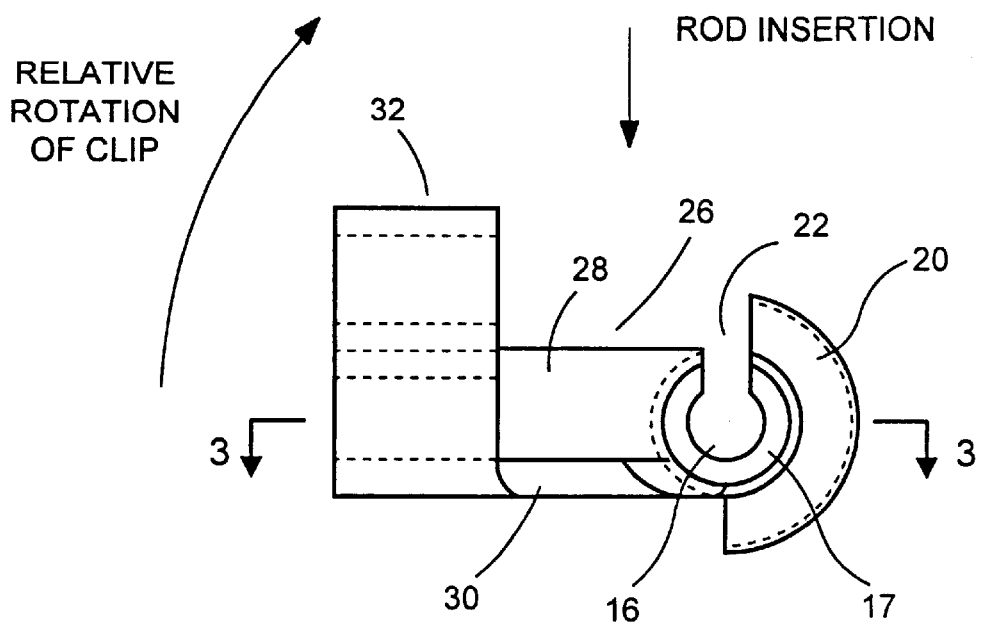
FIG. 2 is a top plan view of the rod end clip of the present invention, and further illustrates the typical direction of relative rotation of the rod end clip of the present invention during installation onto the rod.
Figure 3:
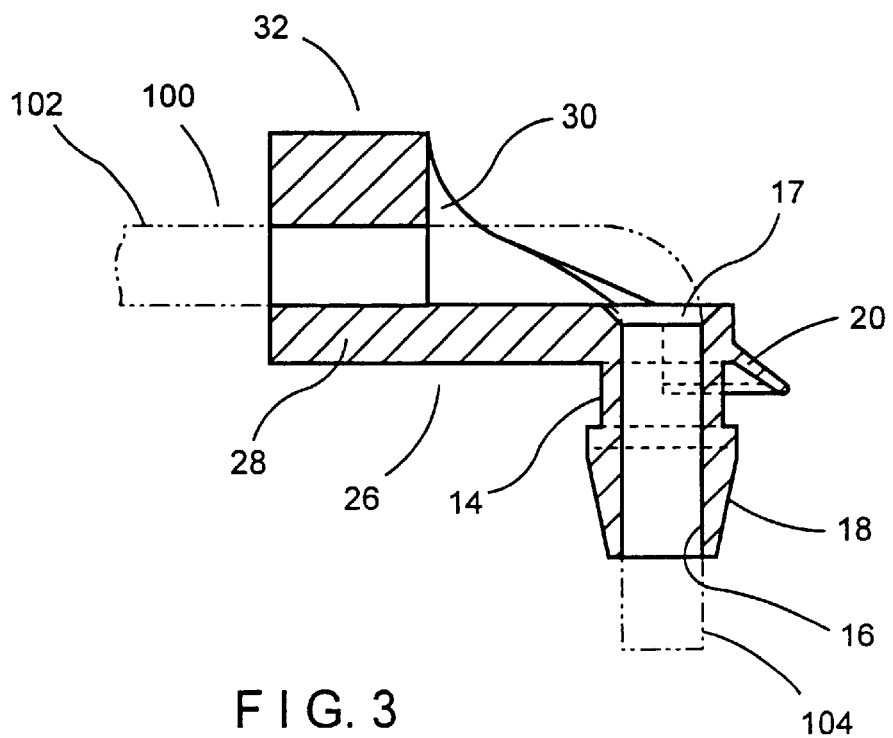
FIG. 3 is a cross-sectional view of the rod end clip of the present invention along plane 3—3 of FIG. 2, additionally showing the installed rod in phantom.
Figure 7:
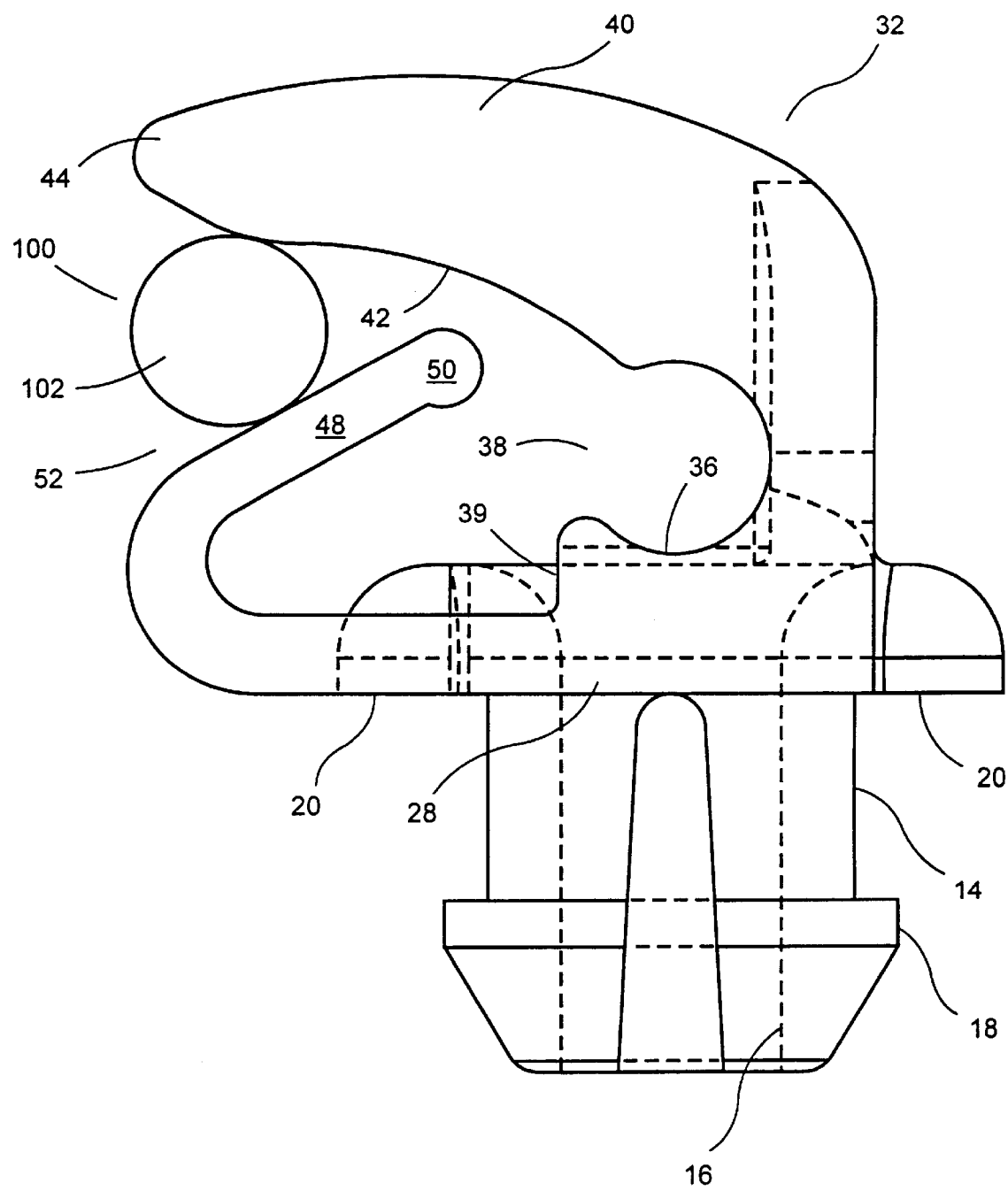
Figure 8:
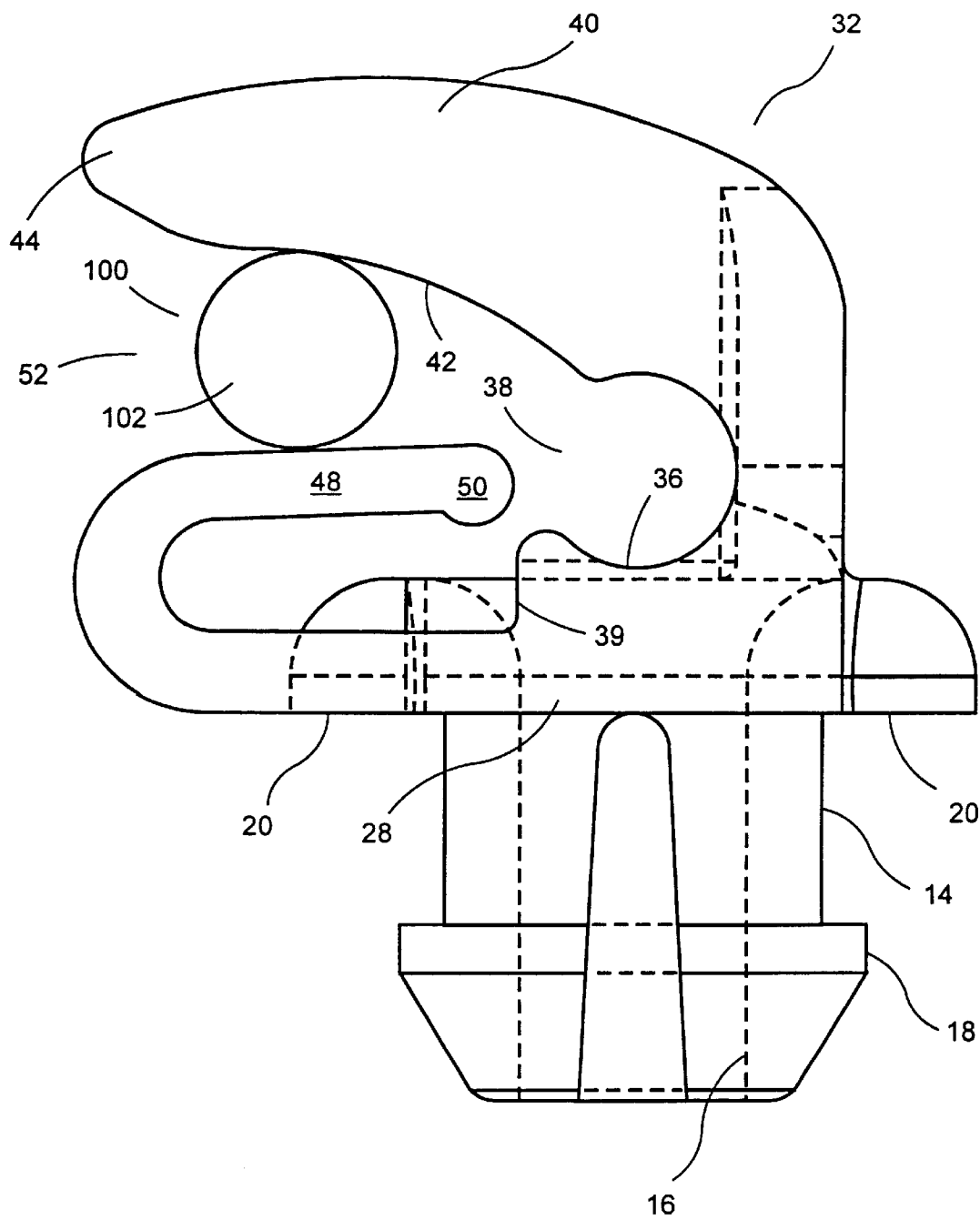
Figure 11:
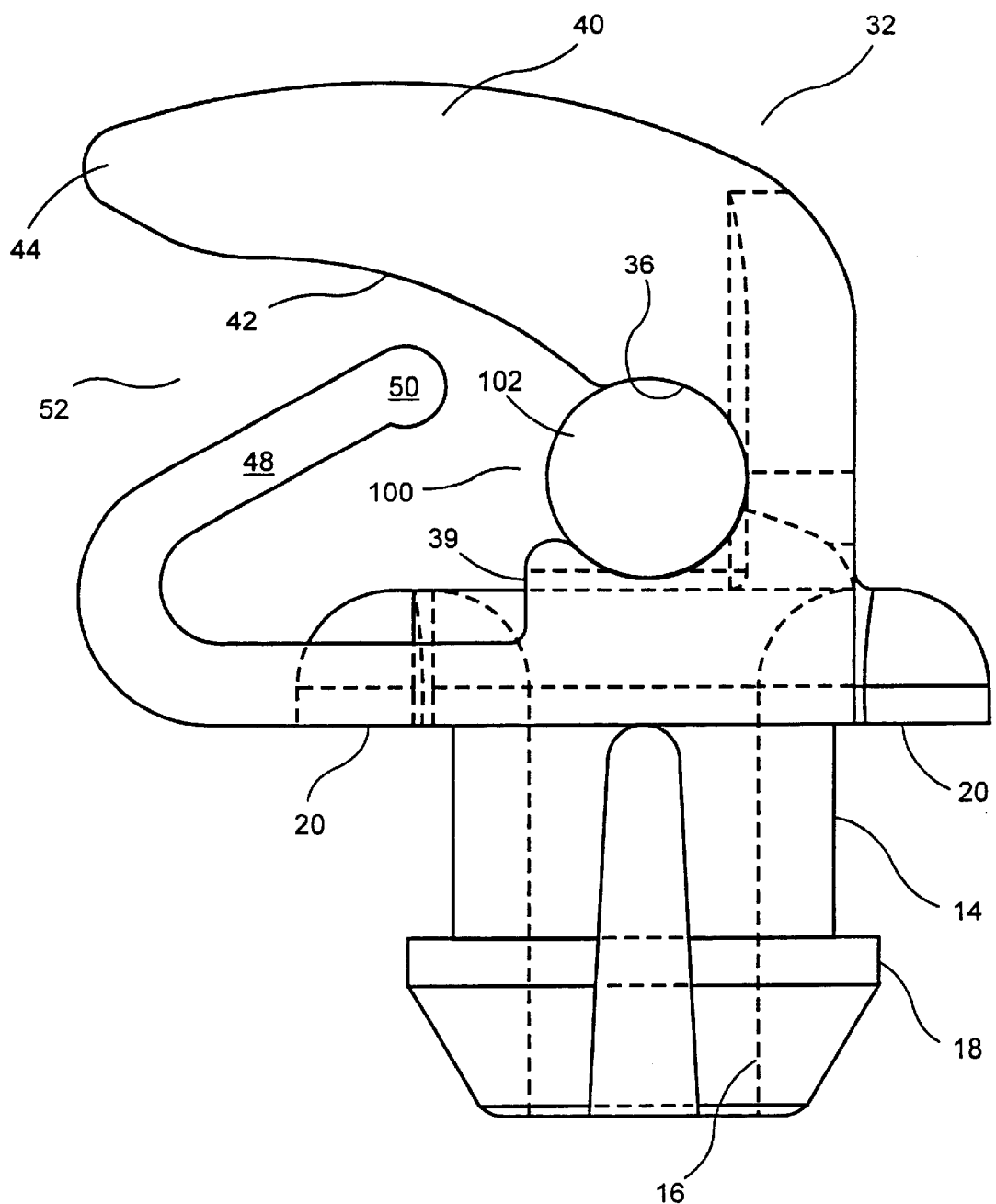

To install rod end clip 10 to rod 100, the user typically first inserts short leg 104 into aperture 16 and pivots rod end clip 10 relatively with respect to long leg 102 so that long leg 102 extends into opening 52 formed in arm assembly 32 as shown in FIG. 7 (also see FIG. 2 for illustration of relative rotation of rod end clip 10). Long leg 102 abuts inner concave face 42 and flexible finger 48. Further relative pivoting of long leg 102 causes flexible finger 48 to flex downwardly allowing long leg 102 to be inserted further into opening 52 as shown in FIG. 8. Still further relative pivoting of long leg 102 causes further downward flexure of flexible finger 48 and further insertion of long leg 102 into opening 52 whereby bulbous end 50 of flexible finger 48 contacts face 39 at mouth 38 of semi-circular seat 36 as shown in FIG. 9. Up to this point, no sound is envisioned to have been generated by rod end clip 10 during the installation process. However, a first audible clicking sound is generated as long end 102 passes over bulbous end 50 of flexible finger 48 as shown in FIG. 10 and long leg 102 of rod 100 enters mouth 38 of semi-circular seat 36 and flexible finger 48 flexes back to the unflexed position. A second audible clicking sound is generated as long leg 102 is seated within semi-circular seat 36 as shown in FIG. 11. As shown in FIG. 11, flexible finger 48 is free of engagement or contact with long leg 102 of rod 100 after installation, and is spaced away from semi-circular seat 36.

Detent head 14 is thereafter inserted into the aperture of a panel (not shown) so that the width of the panel is engaged between upwardly extending detent flanges and extending umbrella flange 20. Typically, detent head 14 would thereafter pivot within the aperture of the panel thereby providing a pivot point for short leg 104 of rod 100. However, it is envisioned that rod end clip 10 could be used for non-pivoting applications and further could include anti-rotational elements.

It is envisioned that flexible finger 48 can be lengthened so that flexible finger 48 flexes to the unflexed position substantially simultaneously with the seating of long leg 102 of rod 100 within semi-circular seat 36 thereby resulting in only a single click which may be desirable for some applications. This may be envisioned as the first and second clicks occurring simultaneously.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A rod end clip including:

a detent head with an aperture therethrough;

a leg assembly perpendicular to a longitudinal axis of said aperture and affixed to said detent head;

an arm assembly affixed to said leg assembly, said arm assembly including a semi-circular rod seat, a guide element, and a flexible finger, wherein said flexible finger and said guide element are opposed to each other thereby forming a channel therebetween which is directed to said semi-circular rod seat, and wherein said flexible finger has an unflexed position spaced away from said semi-circular rod seat and a flexed position spaced toward said semi-circular rod seat in relation to said unflexed position.

2. The rod end clip of claim 1, wherein the rod end clip is arranged and constructed to engage a rod end, the rod end comprising a first rod portion perpendicular to a second rod portion.

3. The rod end clip of claim 2, wherein the rod end clip is arranged and constructed for the first rod portion to be inserted into said aperture thereby allowing the second rod portion to pivot into said channel and become seated with said semi-circular rod seat.

4. The rod end clip of claim 3 wherein said flexible finger flexes from said unflexed position to a flexed position in response to pivoting of the second rod portion through said channel, and subsequently flexes from said flexed position to said unflexed position as said second rod portion approaches said semi-circular rod seat.

5. The rod end clip of claim 4 wherein a first audible click is generated as said flexible finger contacts the second rod portion while flexing from said flexed position to said unflexed position.

6. The rod end clip of claim 5 wherein a second audible click is generated as the second rod portion is seated within said semi-circular seat.

7. The rod end clip of claim 6 wherein said semi-circular rod seat has a periphery exceeding 180°.

8. The rod end clip of claim 7 wherein said semi-circular rod seat has a periphery substantially equal to 270°.

9. The rod end clip of claim 8 wherein said flexible finger is free of contact with said second rod portion when said second rod portion is seated within said semi-circular seat.

10. The rod end clip of claim 9 wherein said guide element includes a concave face facing said flexible finger, and extending from said semi-circular seat to a distal end of said guide element.

11. The rod end clip of claim 10 wherein said detent head includes an umbrella flange facing radially extending flanges for engagement of a panel therebetween.

12. The rod end clip of claim 11 wherein said flexible finger flexes from said flexed position to said unflexed position substantially simultaneously with the second rod portion seating in said semi-circular seat thereby causing said first click and said second click to occur substantially simultaneously.

* * * * *